May 18, 1948.  H. H. PLATT  2,441,920
ROTARY WING AIRCRAFT
Filed Jan. 25, 1939   5 Sheets-Sheet 2

Fig. 4.

INVENTOR.
Haviland H. Platt
BY Leonard L. Kalish
ATTORNEY.

INVENTOR.
Haviland H. Platt
BY Leonard L. Kalish
ATTORNEY.

Patented May 18, 1948

2,441,920

UNITED STATES PATENT OFFICE 2,441,920

ROTARY WING AIRCRAFT

Haviland H. Platt, New York, N. Y., assignor, by mesne assignments, to McDonnell Aircraft Corporation, St. Louis, Mo., a corporation of Maryland Application January 25, 1939, Serial No. 252,809

6 Claims. (Cl. 244—17)

The present invention relates to rotative winged aircraft and it relates further to power-driven rotative winged air craft in which the rotor may, at will, be power-driven to supply both vertical thrust required for sustension as well as for vertical ascent as well as forward or lateral thrust for forward propulsion and lateral control, and the present invention further relates to multi-rotor type of craft wherein the torque reactions of the several rotors upon the fuselage may be balanced against each other so as to neutralize each other and thereby to make it unnecessary otherwise to counteract the torque reaction of rotors in the power-driven condition thereof.

One of the objects of the present invention is the attainment of substantial stability under varying flight conditions.

A further object of the present invention is to completely neutralize torque reactions of the several rotors under all operating conditions and notwithstanding all the variants encountered in the different operating conditions.

A further object of the present invention is to provide means whereby excessive variations in rotor speed may be prevented under different flight conditions and notwithstanding the many variants encountered in different flight conditions.

A further object of the present invention is to provide means whereby failure of either engine or transmission will not render the aircraft uncontrollable but which will permit adequate control of the aircraft notwithstanding failure of either engine or power transmission to either one or several rotors.

A further object of the present invention is to permit vertical ascent and hovering without loss of engine efficiency by reason of overheating of the engine.

A further object of the present invention is to facilitate maneuverability or control of the aircraft under all flight conditions as well as on the ground.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

In the accompanying drawings in which like reference characters indicate like parts.

In the embodiment of the present invention shown in the drawings, a fuselage 1 of suitable construction is formed with a pair of opposite and laterally extending cantilever pylons or arms 2 and 3 generally of a hollow type suitably braced for vertical lift as well as for fore and aft stressing as well as to resist torsional stresses. In the embodiment shown, the cantilever pylon arms 2 and 3 are covered with a continuous sheathing of the fuselage. The cantilever arms may be formed either with the surface or skin sheathing stressed so as to contribute to the strength of the arms in one or more directions (that is, to resist vertical load or fore and aft forces or torsional forces), or the sheathing may be entirely unstressed and serving merely as a fairing to minimize the net drag of the arms as a whole.

The arms 2 and 3 may also be formed of a cambered cross-section to contribute some lift when the craft has substantial forward air speed, although in the embodiment here shown, the amount of lift obtainable from the relative vertically projected area of the arms would be comparatively small.

The fuselage is also preferably provided with a stationary vertical tail surface 4 from which a movable or adjustable vertical tail surface or rudder 5 extends, being hingedly or pivotally mounted in any suitable manner. A stationary horizontal tail surface 6 is also preferably provided, from which the horizontal movable or adjustable tail surfaces 7 and 8 extend (also suitably pivoted or hingedly secured). These stationary stabilizing surfaces 4 and 6 and the adjustable or variable stabilizing and control surfaces 5, 7 and 8 cooperate with the rotor controls in a manner to be hereinafter described, so that by such combined action, certain phases and features of control are made available.

The engine 9 may be mounted slightly behind the vertical plane passing through the rotor hub axis or may be mounted more or less in line with the rotor hub axis, that is, in line with the vertical plane passing therethrough. In the particular embodiment of the invention here shown, the engine 9 is located slightly behind such vertical plane and with its drive shaft 10 extending forwardly in a generally horizontal direction into the differential power-transmission housing 11 located more or less in the vertical plane passing through the rotor hub axis. From the differential transmission device 11, drive shafts 12 and 13 extend laterally in opposite directions through the cantilever arms 2 and 3, respectively, to similar rotor heads 14 and 15, one of which (15) is shown in detail in Figures 6 and 7.

Figure 4:
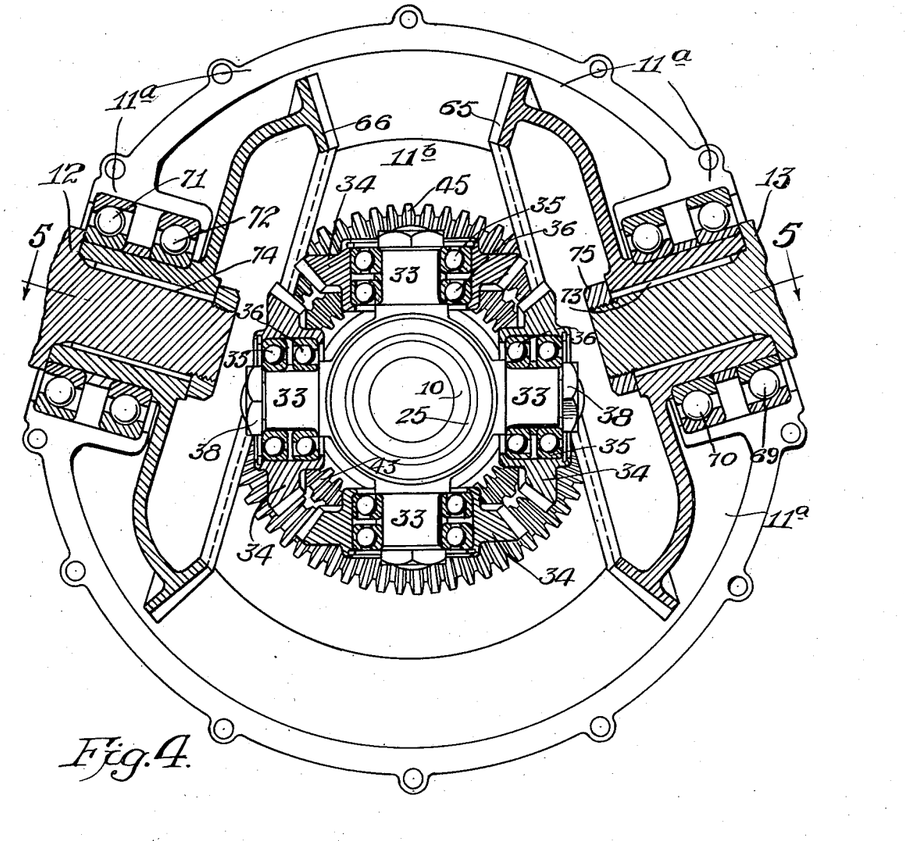
Figure 4 represents a vertical section through the power transmitting differential gear housing and gear train in the fuselage at the point of convergence of the two drive shafts leading to the two rotors.
Figure 5:
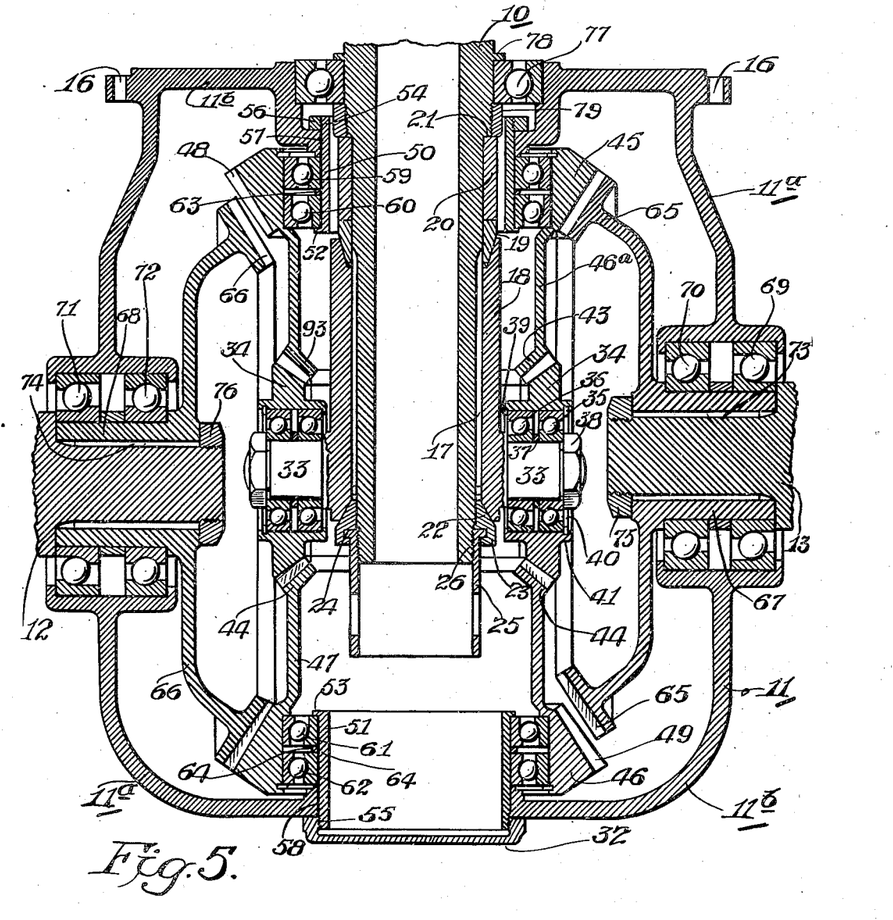
Figure 5 represents a section on line 5—5 of Figure 4.

The differential transmission housing 11 may be supported by direct attachment to the fuselage or to fuselage structural members, or it may be fastened directly to the engine itself through bolts or other fastening means passing through suitable holes 16 in one end of the housing. In the latter event, the differential transmission becomes closely coupled to the engine so that it tends to form a single unit therewith from the standpoint of weight distribution and so that the engine, together with the differential transmission as shown in Figures 4 and 5, may be centered more or less approximately in the vertical plane passing through the rotor hub axis.

The housing 11 may be formed of two more or less similar halves along a dividing plane passing through the axis of the drive shafts 12 and 13, although it may be otherwise divided, as for instance, along a plane passing through the engine shaft axis 10. In the particular embodiment here shown, the plane of division passes generally through the axis of the two drive shafts 12 and 13.

The engine shaft 10 may be either the crank shaft of the engine or an extension thereof or it may be a driven shaft extending from a reducing gear mechanism directly associated with the engine or as a countershaft associated with and driven by the crankshaft, depending upon the type of engine used, that is, depending on whether the engine is designed for and equipped with reducing gearing or counter-shaft or whether it is a direct drive. In any event, however, the shaft 10 is the shaft through which the engine delivers the power.

The shaft 10 is preferably splined as at 17, and telescopically superimposed upon this spline portion is a correspondingly splined sleeve 18 which is thereby keyed to the shaft 10 against relative rotation. The sleeve 18 is provided with concavely conical terminal portions and is held against axial displacement by the cone-shaped centering bushing or sleeve 19 held at one end by the spacer sleeve or bushing 20 which bears against the shoulder 21 on the shaft and a similar conical centering sleeve or bushing 22 which engages the concave conical outer end of the sleeve 18. The outer conical centering bushing 22, just as the inner centering bushing 19, are both snugly fitted over the cylindrical portions of the shaft 10, so that they will accurately center and keep centered the member 18 in relation to the shaft 10. The outer conical centering bushing 22 may be made of two halves or it may be split into two or more than two segments, and may be provided with an internal annular groove 23 adapted to receive the outwardly extending lateral flange 24 of the clamping nut or threaded tightening sleeve 25 which is threaded onto the outer threaded portion 26 of the shaft 10. By drawing the nut or sleeve 25 onto the outer threaded end 26 of the shaft 10, the outer conical centering bushing 22 is driven tightly into the conical end of the member 18, thereby to tighten it and center it at the same time.

The sleeve 18 is in effect a planet arm or spider carrying one or more radially extending spindles 33 on which are mounted similar bevelled planet pinions 34. For the purposes of reducing the contact pressure on the teeth, a number of such spindles 33 and pinions 34 are provided, distributed around the circumference at equal distances. In the construction shown, two or more such spindles and pinions may be carried by the member 18. Each of the pinions 34 is supported on the spindle 33 by suitable ball or roller bearings or other anti-friction bearings 35 and 36 with their inner or stationary races being spaced from each other by a spacer ring 37 and being fastened tightly between the shoulder at the root of the spindle 33 and the nut 38. The outer or movable races of these bearings are held between the inwardly extending flange 39 of the pinion hub and the outwardly expansible spring locking ring 40 expanded into the internal groove 41 in the hub of the pinion. The bearings 35 and 36 are preferably so arranged as to take radial as well as axial thrust because the power is transmitted through surfaces inclined to the axis by reason of the fact that the pinion is bevelled. Thus, one or both of the bearings 35 and 36 may be combined thrust and radial bearings, as for instance, the bearing 36 which is shown as being of the combined thrust and radial type. If desired, however, one or two roller type bearings may be used, as for instance, bevel roller bearings with the effective angle of the bevel inclined generally the same as the inclination of the bevel gear.

The planet pinions 34 are constantly in mesh with a pair of opposed bevel gears 43 and 44, respectively, which are arranged generally coaxially with respect to the axis of the shaft 10.

Each of the bevel gears 43 and 44 is carried on similar hubs 45 and 46, whose tubular axial extensions 46a and 47, respectively, carry the bevel gears 43 and 44, and whose basal portions 45 and 46 have formed thereon similar bevel gears 48 and 49.

The basal portions 45 and 46 of the bevel gear hubs are journalled upon similar stationary tubular spindles 50 and 51, respectively, mounted in the opposite ends of the housing members 11—a and 11—b, respectively.

Each of the tubular spindles 50 and 51 is provided at its inner end with an outwardly extending flange 52 and 53, respectively, and is threaded at its outer end as at 54 and 55, to receive the nut 56 and 32, respectively. The tubular spindles 50 and 51 fit closely in the openings 57 and 58, in the housing members 11—a and 11—b, respectively, and between the respective flanges 52 and 53 on one hand and the housing on the other hand, pairs of similar ball bearings or other anti-friction bearings 59 and 60 and 61 and 62 are mounted, with spacer rings 63 and 64 intermediate the inner races of the ball bearings. By tightening the nuts 56 and 32, the stationary or inner races of the bearings are held rigidly to the frame. One of the ball bearings in each pair, as for instance, the ball bearing 60 and the ball bearing 61 may be of the combined radial and thrust type for resisting or bearing the axial component of the forces exerted upon the bevel gears 43 and 44 and upon the bevel gears 48 and 49.

A pair of similar driven bevel gears 65 and 66 are arranged opposed to each other and with their axes slightly spaced in opposite directions from the axis of the spindles 33 or spaced slightly in opposite directions from the plane passing through the axis of the spindles 33, so that one of the gears 65 meshes with the gear 48 while the other gear 66 meshes with the gear 49.

The hubs 67 and 68, respectively, of the gears 65 and 66 are journalled in similar pairs of ball bearings or other anti-friction bearings 69 and 70 and 71 and 72, the outer races of which are held between the two separable halves 11—a and 11—b of the housing 11, while the inner races of which are held between the shoulder on the respective hubs and an outer shoulder on the shafts 12 and 13 which pass through the gear hubs and which are splined thereto by a series of circumferentially distributed splines 73 and 74, respectively. Nuts 75 and 76 serve to lock the shafts in the gear hubs against axial displacement.

When the resistance to turning the shafts 12 and 13 is equal, then there will be no relative motion between the planet pinions 34 and the gears 43 and 44 and 48 and 49. They will all turn together as though one unit with the shaft 10. Therefore, under conditions of equal resistance to turning in the shafts 12 and 13, the two shafts 12 and 13 will rotate together in the same direction and at the same speed.

Should there be any inequality, however, in the resistance offered by the shafts 12 and 13 to turning, then the two gears 43 and 44 and the corresponding gears 48 and 49 will be rotated in opposite directions relative to each other, although still rotating in the same general direction; that is, they will be rotated in the same direction but at different speeds, this difference being brought about by the rotation of the planet pinions 34. Under these conditions, therefore, the two shafts 12 and 13 will likewise be rotated in opposite directions relative to each other but with both of them still rotating in the same direction but at different speeds. This speed difference or difference in rotational speed will be just sufficient to equalize the torque on the two shafts.

The shaft 10 may also be supported in the housing 11 by a ball bearing 77 held between the flange 78 on the shaft and the nut 79 thereon.

The slightly offset shafts 12 and 13 are extended upwardly in the manner indicated in Figure 4, at an angle more or less corresponding to the upward inclination of the two cantilever arms 2 and 3 (Figure 2) through which these shafts extend. Universal joints of conventional type may be provided to permit deflection without bending stresses in the shafts.

Figure 6:
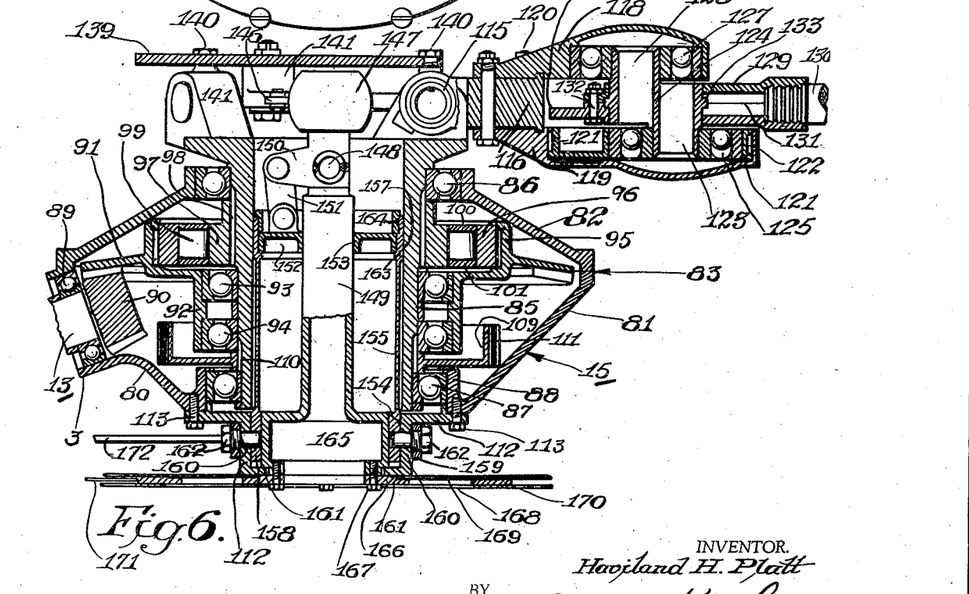
Figure 6 represents a section of one of the two rotor heads; one being at the outer end of each of the two similar drive shafts leading to each of the two rotors.

The outer ends of the cantilever arms 2 and 3 terminate in or have attached thereto similar housings 79 and 80, illustrated particularly in Figure 6, with the housing preferably formed of a lower and an upper half 81 and 82 respectively, which are separable along the parting line 83 where they may be held together by a series of peripherally distributed bolts or screws 84.

Arranged in a generally upright position within the housing 80, is a hollow rotor hub spindle 85 supported at its two extremes by ball bearings 86 and 87 or other suitable anti-friction bearings such as roller bearings or the like, one or both of which are of the combined radial and thrust type so as to resist the lift exerted in an upright or axial direction. In the particular illustration shown, the lower bearing 87 shown is of the combined radial and thrust type whose outer race is held in the portion 88 of the lower housing member 81.

The ends of the shafts 12 and 13 are mounted in similar bearings 89 and carry similar helical bevel pinions 90 which are constantly in mesh with corresponding driven helical bevel gears 91 whose hubs 92 are journalled on ball bearings or other anti-friction bearings 93 and 94 upon the outer cylindrical surface of the hollow tubular rotor hub spindle 85. The gear 91 is also provided with an internally splined cylindrical flange or drum 95, within which is mounted and to which is splined the externally splined outer race 96 of a roller type or any other suitable type of overrunning clutch. A corresponding inner race 97 of the overrunning clutch is similarly splined at 98 to the outer surface of the tubular rotor hub spindle 85, and between the two races 96 and 97 a series of circumferentially distributed rollers 99 are interposed and held in place between annular plates 100 and 101, which may be pinned, screwed or riveted together intermediate the rollers 99 merely to act as a cage or retainer for retaining the rollers 99. The inclination of the eccentric surfaces or cam surfaces of the overrunning clutch is so arranged that when the speed of the rotor hub spindle 85 would tend to lag behind the speed of the shaft 13, the clutch rollers 99 will engage and will permit the shaft 13 (through the pinion 90 and gear 91) to drive the rotor hub spindle 85 and the rotor fixed speed ratio determined by the gear ratio between the parts, while if the driving shaft 13 slowed down below the then speed of the rotor or if the rotor picked up speed beyond the then corresponding speed of the driving shaft 13, the clutch would release and the rotor would rotate free of the drive shaft 13.

By this means, any failure in the transmission permits the rotors to perform in an autorotative manner without any hindrance from any gearing and it also permits the autorotative operation of the rotors for various maneuvers where it may be desirable to auto-rotate instead of power-drive the rotors.

A brake drum 109 may be splined to the rotor hub spindle as at 110, and may be surrounded by an externally contracting brake band 111 operated through any suitable brake band contracting or expanding means mounted in the housing member 81 and having external cable control or other suitable control extending into the cockpit or having suitable control means extending into the cockpit cantilever arms 1 and 2.

To the rotor housing member 81, housing extension 112 is secured, as for instance by the bolts 113, said housing extension 112 being coaxially disposed with respect to the rotor hub spindle 85.

Within the lower housing extension 112, the cyclic pitch change control means (to be described more in detail hereinafter) are mounted.

The upper end of the rotor hub spindle 85 carries a number of blade attachment lugs 114 depending on the number of blades in the rotor. In the particular embodiment of the invention here shown, a three-blade rotor is contemplated, although this may be increased or decreased. A three-bladed rotor, however, has been found preferable in some respects.

Each of the blade attachment lugs is offset from the radial location, so that in a mean or cruising power operation, the blade axis is in line with the center of each lug, as shown particularly in Figure 7 (the blades being arranged for lag about a generally upright lag pivot, in a manner to be described more in detail hereinafter). By this disposition of the blade attachment lugs 114, side thrust and bending moment on the flapping pivots 115 is reduced to a minimum.

To each of the blade attachment lugs 114, a flapping pivot member 116 is pivotally secured by means of the hollow tubular (or solid) pivot 115. This permits the free flap of the blades for coning purposes.

Set screws 117 extended through the lugs 114 may be arranged to keep the hollow pivot pins 115 fast in the lugs 114 so that the pivot member 116 will oscillate in relation to the pivot pins.

To the pivot or hinge member 116, the upright pivot housing members 118 and 119 are secured by bolts 120 or by other suitable means, or one of these housing members (118 and 119) may be formed integrally with the hinge member 116.

Within one of the two housing members 118 and 119, as for instance in the lower one as in the embodiment shown in Figure 6, an eccentric ring 121 is mounted with needle type roller bearing 122 interposed for freer rotation, and within the eccentric ring 121, but eccentrically with respect thereto one end 123 of an offset upright pivot member 124 is journalled by means of the self-aligning ball bearing 125 (or other self-aligning anti-friction bearing such as a self-aligning roller bearing). The other end 126 of this same offset pivot member 124 is similarly journalled in the other housing member 118 by self-aligning ball bearing 127 (or other similar self-aligning bearing).

By this means (and without any displacement of the eccentric ring 121), the pitch of the blade 128 will be varied as it swings to and fro about the offset pivot axes. The blade is so arranged that in auto-rotative (or power-free) operation, the blade pitch will be a small angle and one best suitable for auto-rotative operation, and so that as the blade lags upon the application of power, the blade angle or pitch will be increased more or less in proportion to the amount of the lag.

Accordingly, the blade root socket 129, in which the blade root 130 is secured in the manner indicated in Figure 6, is preferably formed of two halves separable along a median plane indicated by the line 131 and preferably held together by a series of bolts 132. The blade root socket 129 is clamped tight about a laterally projecting annular rib 133 which extends around the center of the combined pivot member 124, so that the blade root socket 129 will be clamped tightly to the pivot member 124 and so as to force all relative rotation to be through the journalled ends 123 and 126 of the pivot 124.

A rearward extension 134 on the blade root socket member 129 may serve as a limiting means for the displacement of the blade about the axis of the pivot 124, as for instance by placing more or less rigid or resilient abutments on the housing 118 or 119 on either side of the extension 134, so as to limit the movement thereof within desired limits.

By the foregoing means, an automatic pitch change is effected which is responsive to the power input or which is responsive to the amount of torque delivered from the engine to the rotor at any time, increasing with the increase of such torque and decreasing with the decrease of such torque until it reaches the auto-rotative angle or pitch in the power-free condition when the lag is reduced to a minimum or substantially zero (that is, the condition in which the blade axis will be more or less approximately radially disposed with respect to the rotor hub axis or will more or less approximately lie in a plane which includes the rotor hub axis).

Figure 7:
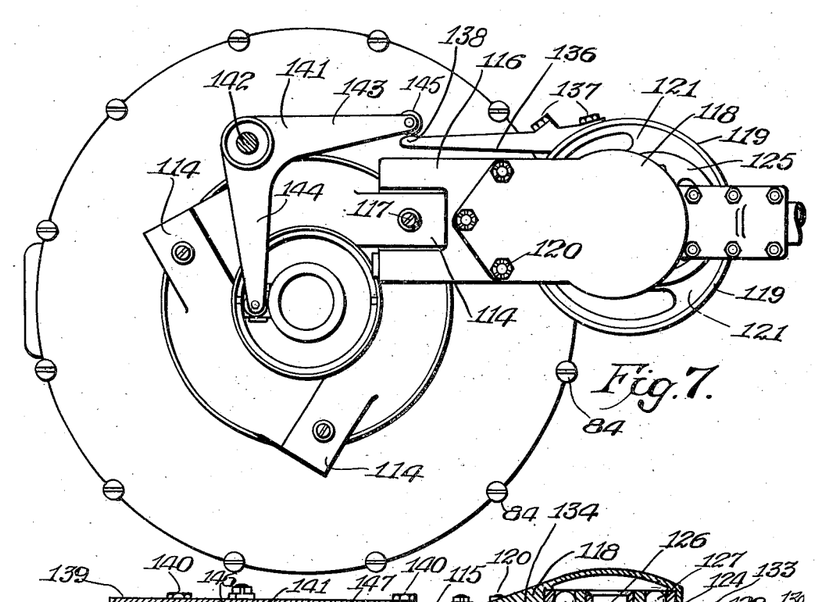
Figure 7 represents a top plan view of the rotor head shown in Figure 6.

To the eccentric ring 121, a lever arm 136 is secured by bolts 137 which may extend through suitable slots in the outer casing 119 which surrounds the eccentric ring (as shown in Figure 7) or the lever 136 may extend around the outer housing 119 and engage the eccentric ring 121 from the inside. The end 138 of the lever 136 is located substantially in alignment with the axis of the flapping pivot pin 115, so that the end 138 of the lever 136 will always remain in substantially the same place in reference to the rotor hub irrespective of the up and down flapping of the blade.

A cover plate or supporting plate or member 139 is superimposed upon the lugs 114 and bolted thereto by means of the bolts 140. These bolts may replace the set screws 117 heretofore mentioned, that is the bolts 140 may serve as set screws. To the underside of the supporting member plate 139, a bell crank member 141 is pivoted around a generally upright pivot 142, having an arm 143 extending towards the lever 136 and overlapping the end 138 thereof and having another arm 144 extending towards the center of the rotor hub as indicated in Figures 6 and 7.

The lever arm 143 of the bell crank lever is preferably provided with a roller 145 for contacting the end 138 of the lever 136. The lever 144 of the bell crank 141 is provided with a similar roller 146 which bears against and is adapted to ride the spherical cam member 147 near the axis of the rotor hub. By displacing the spherical cam 147 from the geometric axis of the rotor hub (in a manner to be described hereinafter), each of the offset pivot members 124 may be correspondingly deflected cyclically to vary the pitch of each blade; the direction of the deflection of the spherical cam member 147 determining the azimuth of the pitch cycle. By this means, the thrust vector of the rotor may be inclined by an amount corresponding to the amount of the displacement of the cam from the rotor hub axis while the direction of such displacement determines the direction or inclination of the thrust vector of the rotor.

In the particular embodiment of my invention herein shown, the displacement of the cam member 147 is effected by pivoting said cam member as at 148 to an upright rotatable member 149 with which it will therefore rotate in unison, and providing a bell crank arm 150 connected through a suitable link 151 to a vertically adjustable ring 152, so that the upward and downward movement of the ring 152 will determine the amount of the cam displacement in relation to the rotor hub axis while the rotation of the member 149 will determine the direction of such displacement.

The member 149 has its upper portion journalled in the ring 152 as at 153, while its lower enlarged end is similarly journalled in the lower end 154 of the tubular member 155; the upper end of the tubular member 155 being in turn journalled in and being freely rotatable in relation to the interior of the tubular rotor hub spindle 85, as at 157, while the lower end 154 of the tubular member 155 is vertically slidable in the stationary lower extension 112 of the housing member 81 but keyed thereto (by a suitable key 158) against relative rotation. The lower cylindrical wall of the housing extension 112 is surrounded by an operating ring 159 which is revoluble in relation thereto. A series of circumferentially distributed elongated slots 160 are extended through the cylindrical part of the housing extension 112; said slots being all arranged in the same common plane. Opposite these slots 160, a similar but inclined series of slots 161 are provided in the lower portion 154 of the cylindrical sleeve 155. A series of pin members 162 are threadedly anchored in the outer control ring or operating ring 159 with their smooth shanks extending through the outer plane slots 160 in the stationary housing extension 112 and into the inclined slots 161 in the lower cylindrical part 154 of the cylindrical sleeve 155. As the lower part 154 of the cylindrical sleeve 155 is vertically movable but otherwise keyed to the stationary housing extension 112 (against rotation) any rotational displacement of the ring 159 around the housing extension 112 will cause the sleeve 155 to be displaced in an up or down direction. This up and down movement is transmitted to the ring 152 which is held between a shoulder 163 in the upper end of the sleeve 155 and a threaded retaining ring or nut 164 threaded into the upper end of said sleeve 155. The ring 152 is freely rotatable in relation to the sleeve 155, however, so that it may rotate with the angular adjusting member 149. Thus, the angular position of the ring 152 is determined by the member 149, while its vertical position is determined by the sleeve 155 (independently of the member 149).

To the lower enlarged end 165 of the angular adjusting member 149, a ring or disc 166 is secured by means of bolts 167, which together with the webs 168 and 169 and the intermediate ring 170, forms a sheave over which a control cable 171 extends, and through which the direction of the member 149 and hence the direction of the displacement of the cam 147 may be controlled. The position of the control ring 159 on the other hand may be controlled by two tension members 172 fastened to suitable lever arms extending from the ring 159 (which lever arms are not shown). Preferably, two opposite arms 175 and 176 are provided on the control ring 159 in the manner indicated in the schematic drawing of the controls in Figure 8 with cables 172 and 173 extending therefrom into the fuselage.

Figure 8:
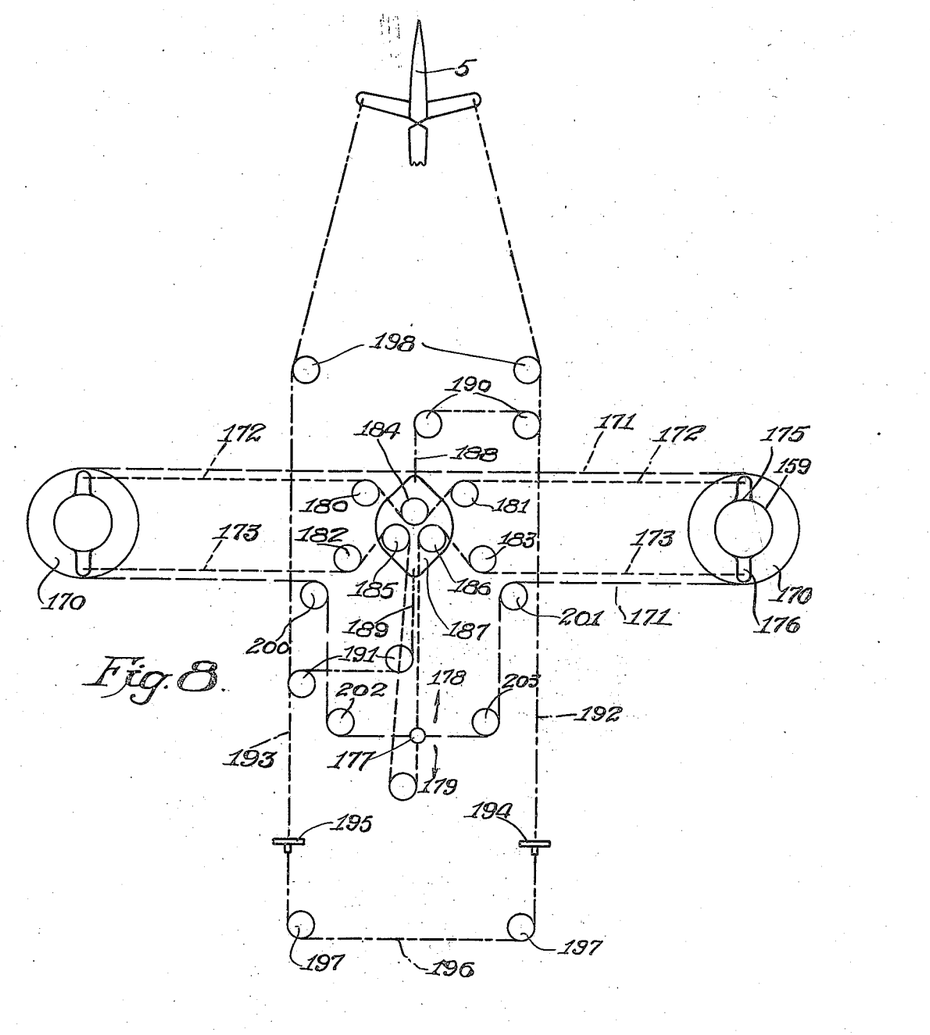
Figure 8 represents a schematic plan view of the controls of a helicopter representing one embodiment of the present invention.

In the embodiment of the invention herein shown, the cables 172 and 173 which control the magnitude of the cyclic pitch change are connected or attached to any conventional control stick 177 in a fore and aft direction in such a manner that when the stick 177 is pulled back in the direction of the arrow 178, the displacement of both spherical cams 147 (that is, in each of the two rotors) will be increased so as successively to incline the thrust vector of the rotors from their normal upright direction (as when hovering) and so that when the stick is moved forward in the direction of the arrow 179, the inclination of the thrust vector from the hovering position will be increased similarly in the opposite direction.

In order that the cyclic pitch change may be directed uniformly or differentially, at will, the cables 172 and 173 are caused to pass over a series of stationary idle pulleys 180, 181, 182 and 183 suitably supported in the fuselage, and a series of floating idle pulleys 184, 185 and 186 which are carried by a movable or floating plate 187, whose position is determined by the supplemental rudder control cables 188 and 189, which pass over idle pulleys 190 and 191, respectively, and are then connected with the main rudder cables 192 and 193 which are connected with the conventional food pedals or treadles 194 and 195 and together with the intervening cables 196 and pulleys 197 and 198, serve to control the rudder 5 heretofore described. By moving the rudder pedals 194 or 195 (differentially) the disc or support 186 is moved backward or forward, thereby causing a differential operation of the two cams 147 in the two rotors, because the forward movement of the disc 186 (by pressing on the pedal 195) causes both cables 172 to be shortened and causes both cables 173 to be correspondingly lengthened so that the two control rings 159 are rotated in opposite directions. The same takes place when the opposite pedal 194 is depressed but the members merely rotate in the reverse direction.

The direct control cable 171 is caused to make a complete circuit around the two sheaves 170 and over the pulleys 200, 201, 202 and 203 to the control stick 177 in such a manner as to be moved by the lateral motion of the same. Thus, the lateral motion of the stick 177 will cause the direction of greatest pitch change or the azimuth of the cyclic pitch change to be directed in the direction opposite to that in which the stick is moved, and by an amount corresponding to the displacement of the stick, so that the thrust of the rotors will be in the same direction as that in which the stick is moved.

Thus, the direction of the propulsive thrust is controlled by the lateral displacement of the stick, and the amount of the displacement of the thrust (positive or negative) by its fore and aft displacement. A direct control, acting differentially on the same displacement cables 172 and 173 of the two rotors, permits the rotation of the whole machine about a vertical axis while hovering, and in conjunction with the conventional rudder 5, actuated by the same control, provides steering in forward and backward flight. 180° of rotation of the cam 147 is sufficient to provide every possible orientation of cam displacement because the cam can be displaced in either one of two directions by the fore and aft motion of the stick 177.

For landing and ground maneuvers, the fuselage is preferably supported on four wheels, namely, the fore and aft wheels 205 and 206 and the lateral wheels 207 and 208; the fore and aft wheels being carried by the fuselage upon suitable hydraulic or other resilient supports, while the lateral wheels 207 and 208 are preferably carried by the cantilever arms 2 and 3, also through suitable hydraulic or other resilient supports.

In place of the cables 172 and 173 applied to the arms 175 and 176, a more or less rigid rod may be used with but a single arm, the rod acting either in tension or compression; that is, operating by push and pull. Likewise, if desired, a single cable may be used supported by a spring of sufficient strength. Instead of the means shown in Figure 8 for differentially varying the amplitude of the pitch change in the two rotors, hydraulic means may be used, as hydraulic means may also be used for transmitting both the amplitude control as well as the azimuth control from the fuselage to the rotor hubs. Thus, the amplitude changing means shown in Figure 6 may be hydraulically operated in the general manner indicated in my copending application Serial No. 242,053, now Patent No. 2,364,096 of December 5, 1944, while the azimuth changing means may likewise be hydraulically controlled by suitable hydraulic actuating cylinders, pistons and transmission lines applied to rotate the members 170. The amplitude and azimuth control means may then be hydraulically inter-related through suitable valves to effect the amplitude of the pitch change in the two rotors either similarly or differentially.

Figure 1:
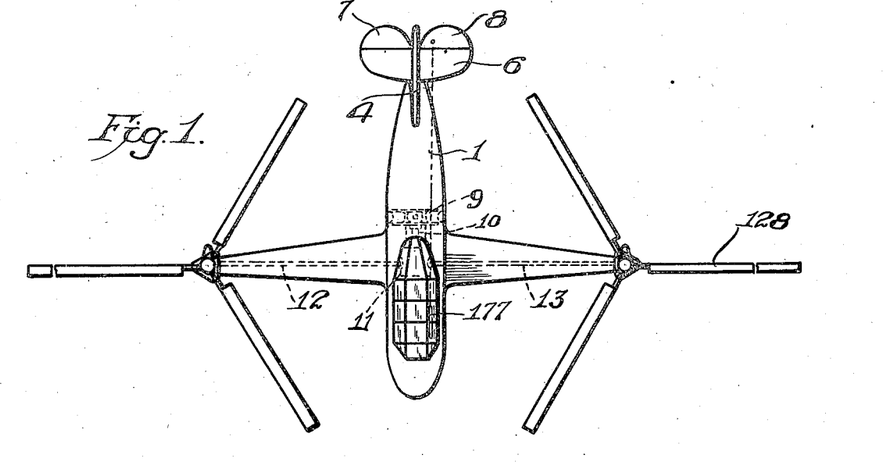
Figure 1 represents a top plan view of one form of rotative winged aircraft embodying the present invention.

As can be seen particularly from Figures 1 and 4, the rotors 128 rotate oppositely; the direction of rotation of the rotors being such that when viewed in top plan, from adjacent the rear of the machine, the left-hand rotor rotates counterclockwise and the right-hand rotor clockwise.

Figure 2:
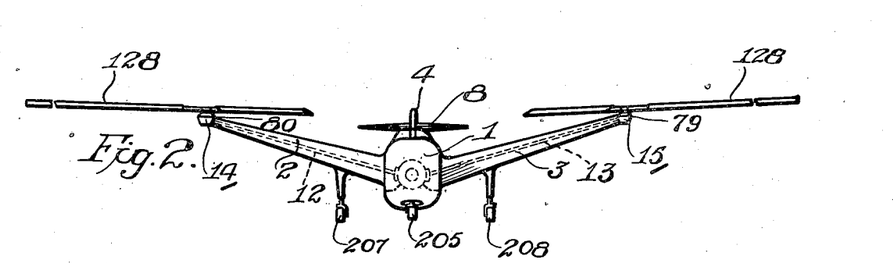
Figure 2 represents a front elevational view of the same.
Figure 3:
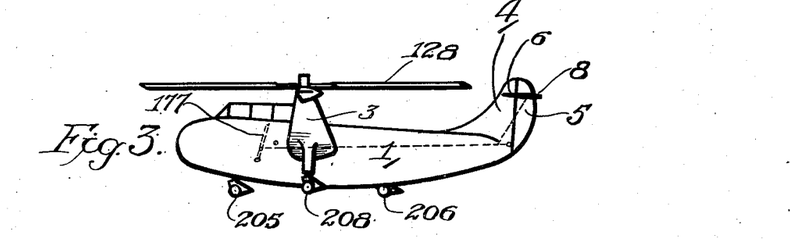
Figure 3 represents a side elevational view of the same.

As can be seen particularly from Figure 2, the outer rearwardly-moving blades of the rotors 128 are inclined upwardly from their hubs while the inner forwardly-moving blades are inclined downwardly from their hubs. Thus, as a result of the aerodynamic and inertial forces on the articulated blades, the composite lift lines or effective axes of rotation of the two rotors are inclined upward and inward so as to introduce a "natural" dihedral effect during translational flight.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A helicopter including two lift rotors having spatially-separated rotation axes, generally upright pivots mounting the blades thereof for lagging in response to driving torque, means mounting said blades for pitch change, and means including self-aligning bearings associated with the pivots for correlating pitch changes with lag changes.

2. A helicopter including a lifting rotor having a driving hub, a blade attached to said hub through generally upright and horizontal pivots, a tiltable mounting for said upright pivot, an eccentric member mounted in said hub, means for controllably varying the eccentricity and the azimuth of said eccentric member, and means operatively interconnecting said eccentric with said tiltably mounted pivot whereby said eccentric controls the tilt of said pivot.

3. In a helicopter supported by two rotors having spatially-separated rotation axes, control means including means for imparting cyclic pitch change to the blades in each rotor, means for varying the azimuth of said cyclic pitch change, means for varying the amplitude of said cyclic pitch change, cable means interconnecting said azimuth change means with the lateral motion of a control stick, cable means interconnecting said amplitude change means with the longitudinal motion of said manual control stick, a floating frame carrying pulleys cooperating with said amplitude change cable means, and cable means connecting said floating frame to control pedals for acting differentially on said amplitude changing means.

4. In a helicopter supported by two rotors having spatially-separated rotation axes, control means including means for imparting cyclic pitch change to the blades in each rotor, means for varying the azimuth of said cyclic pitch change, means for varying the amplitude of said cyclic pitch change, means interconnecting said azimuth change means with the lateral motion of a manual control, means interconnecting said amplitude change means with the longitudinal motion of said manual control, foot controls and means operatively interconnecting said amplitude changing means with said foot controls, whereby the amplitude changing means will be caused to act differentially upon the operation of said foot controls.

5. A helicopter including a fuselage having a pair of laterally extending pylons extending from the fuselage at a point below the center of gravity of the helicopter, a lift rotor carried by each of said pylons, an engine in the fuselage for driving said rotors, said pylons presenting a substantial aerodynamic resistance in a vertical direction in rapidly moving zones of the slip streams of the rotors and at a point below the center of gravity of the helicopter.

6. A helicopter including a fuselage, a rotor, an engine for driving the same, and means beneath said rotor and in a rapidly moving zone of the slip stream thereof and beneath the center of gravity of the helicopter for imposing drag beneath the center of gravity of the helicopter, thereby to stabilize the helicopter.

HAVILAND H. PLATT.

REFERENCES CITED

The following references are of record in the file of this patent:

UNITED STATES PATENTS

| Number | Name | Date |
|---|---|---|
| 1,350,982 | Burrier | Aug. 24, 1920 |
| 1,380,406 | Mott | June 7, 1921 |
| 1,830,731 | Wylie | Nov. 3, 1931 |
| 1,849,766 | McGuire | Mar. 15, 1932 |
| 1,900,689 | Baum | Mar. 7, 1933 |
| 1,910,520 | Cierva | May 23, 1933 |
| 1,919,089 | Breguet | July 18, 1933 |
| 1,942,888 | West | Jan. 9, 1934 |
| 1,957,813 | Wilford | May 8, 1934 |
| 2,321,572 | Campbell | June 15, 1943 |
| 2,337,570 | Pullin | Dec. 28, 1943 |

FOREIGN PATENTS

| Number | Country | Date |
|---|---|---|
| 22,162 | Great Britain | Sept. 29, 1909 |
| 274,973 | Great Britain | Aug. 2, 1927 |
| 499,073 | Great Britain | Jan. 18, 1939 |

OTHER REFERENCES

The Focke-Wolf Helicopter.
Publication: "Flight," pages 380–383, inclusive, of April 21, 1938.
Jane's All the World's Aircraft, 1937, page 172c.